Patented Feb. 13, 1940

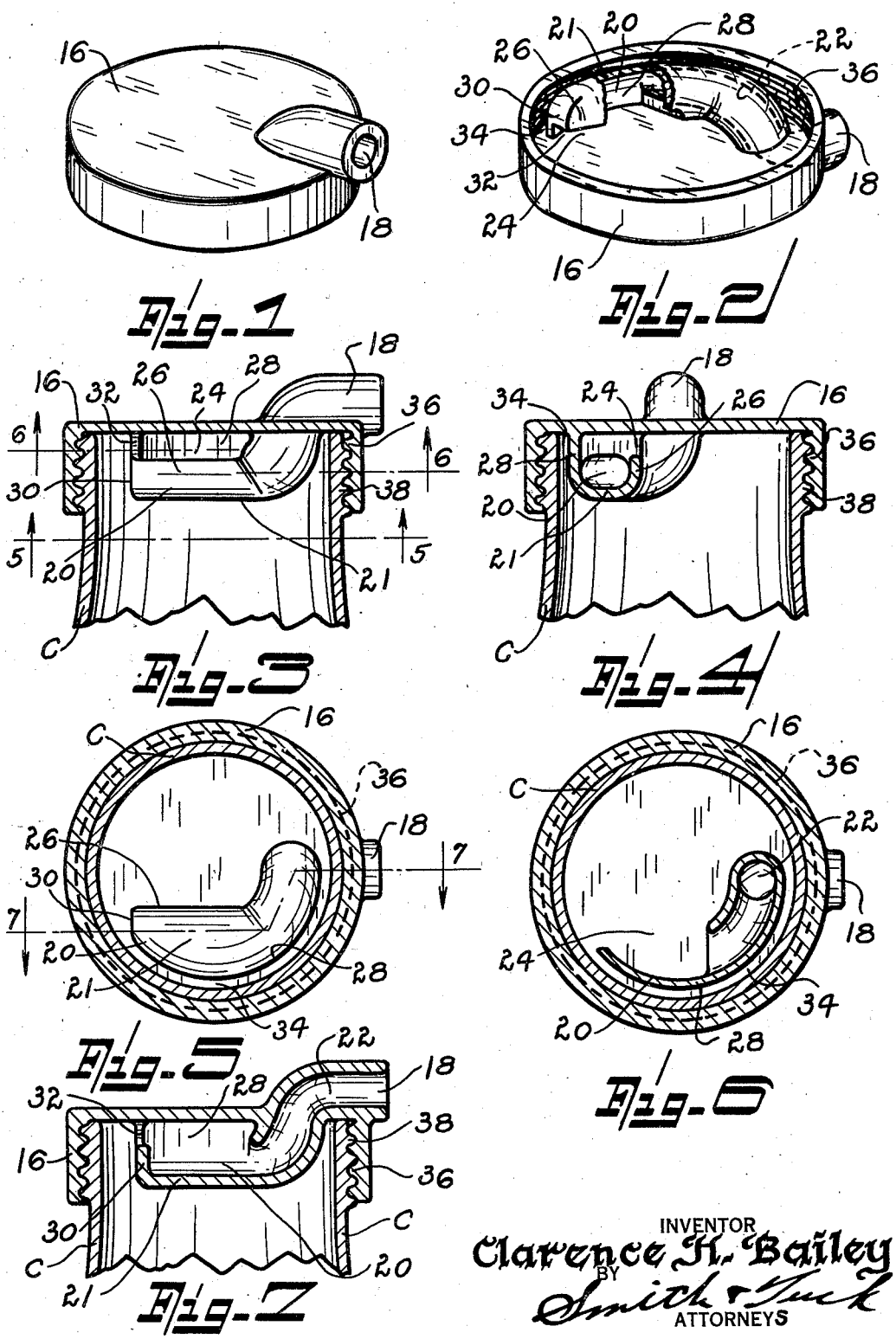

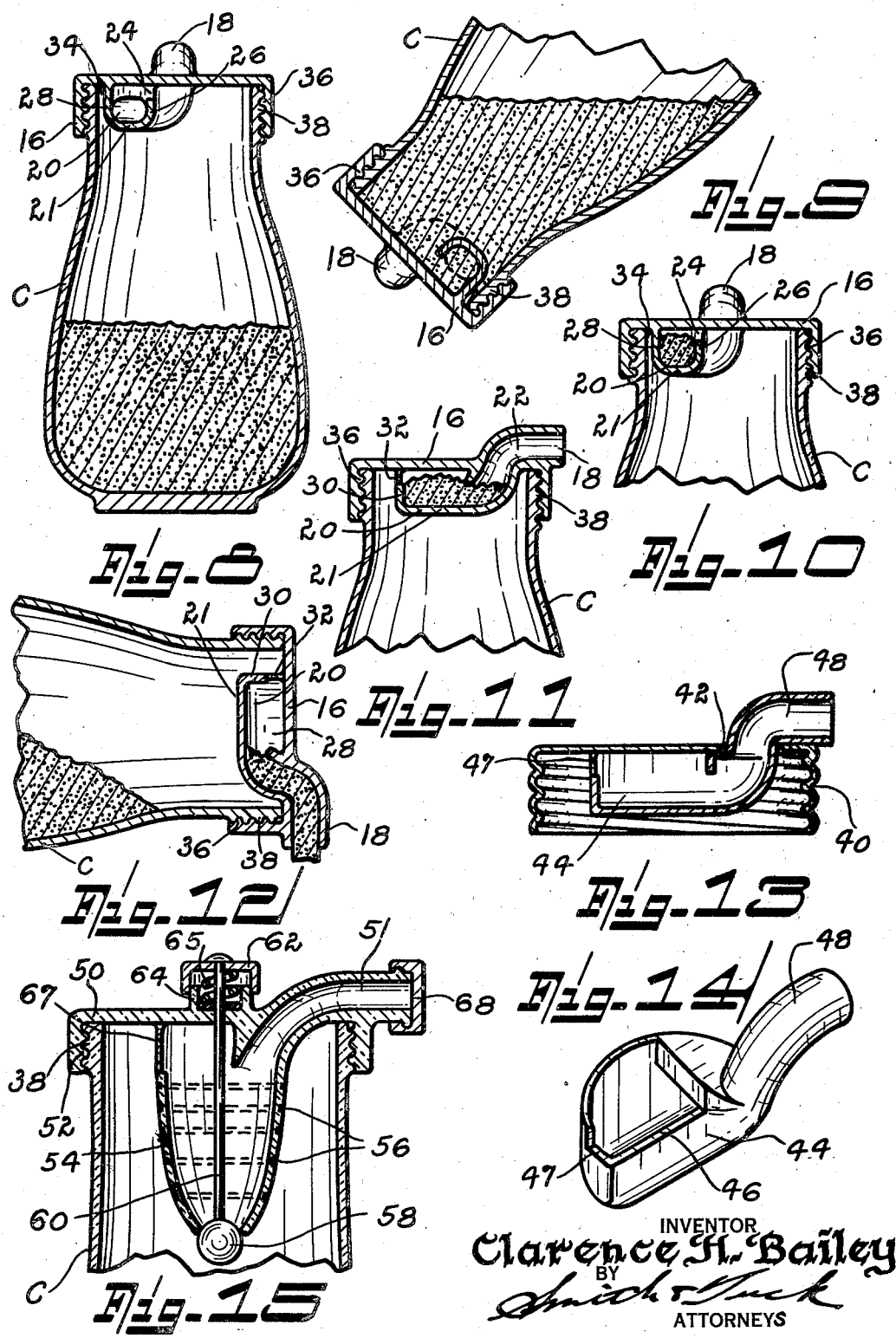

2,190,092

UNITED STATES PATENT OFFICE 2,190,092

CAP FOR USE WITH VARIOUS TYPES OF VESSELS FROM WHICH IT IS DESIRED TO DISPENSE MEASURED QUANTITIES OF FREE FLOWING MATERIALS

Clarence H. Bailey, Seattle, Wash.

Application August 22, 1938, Serial No. 226,194

3 Claims. (Cl. 221—98)

My present invention relates to the art of measuring and dispensing devices and more particularly to a cap for use with various types of vessels from which it is desired to dispense measured quantities of free flowing materials.

There are many uses for a cap which can be threaded, or otherwise secured to a vessel, or jar, for the purpose of dispensing pourable ingredients such as sugar, salt, cereals, drugs, or the like.

A most common use for such a device is in the handling of sugar, particularly in restaurants where it is desirable to have a container so covered that the contents cannot be contaminated by careless persons and yet which will dispense a given amount such as a teaspoonful, or tablespoonful. A similar use is found in kitchens where it may be desirable to have such a dispenser that will accurately measure salt or other food ingredients such as spices and condiments. In stores it may be very desirable to have such caps made in larger sizes for dispensing various items for sale, in accurately measured quantities.

My present device is arranged with a pouring spout on the outside and a measuring chamber inside the cover of the jar, or bottle, closure. This measuring chamber is filled by partially or wholly inverting the container and the dispensing is accomplished by rolling the same, while it is in a more or less horizontal position, approximately 90 degrees, so that all the ingredients can be poured from the container, but any of the supply from the main portion of the container will be prevented from entering the measuring chamber and thus interfering with accurate dispensing.

The principal object of my invention is to provide an easily operated measuring and dispensing cap, which may be secured to various types of containers, and which will with the minimum of inconvenience accurately measure a given amount of any pourable ingredient or liquid.

Other and more specific objects will be apparent from the following description taken in connection with the accompanying drawings, wherein Figure 1 is a perspective view of a cap made after the teachings of my present invention.

Figure 2 is a perspective view of the under side of the cap shown in Figure 1, the same being partly broken away and shown in section to better illustrate the construction.

Figure 3 is a typical, sectional view, in elevation, through my dispensing cap showing a portion of a container in section.

Figure 4 is a sectional view, in elevation, taken at right angles to the showing of Figure 3.

Figure 5 is a cross-sectional view, in plan, substantially on the line 5—5 of Figure 3.

Figure 6 is a cross-sectional view taken in the same sense as Figure 5, but taken along a higher cutting and broken plane as indicated by the line 6—6 of Figure 3.

Figure 7 is a sectional view, in elevation, similar to Figure 3 but with the vertical cutting plane passing through the measuring chamber and pouring spout, the same being broken after the showing of the dotted line 7—7 of Figure 5.

Figure 8 is a cross-sectional view through my cap and container suitable for use therewith.

Figures 9, 10, 11, and 12 are fragmentary, sectional views showing the sequence of operation in charging my measuring chamber and in dispensing the same.

Figures 13 and 14 are, respectively, a vertical sectional view, and a perspective view, showing a modified form of my dispensing cap and the measuring device used with the same.

Figure 15 is a sectional view, in elevation, showing a modified form of my measuring chamber, and illustrating the same as adapted for the dispensing of liquid or a pourable ingredient.

Referring to the drawings, throughout which like reference characters indicate like parts, 16 generally designates the body of my dispensing cap. This may be made of any suitable material such as die cast metal, the various molded plastics, or glass. Further the method of securing my cap to the vessel with which it is used is a matter of individual design. Throughout the accompanying drawings I have indicated the same as being screwed on a jar, merely as one convenient form of securing the same thereto.

On the outside of my cap I provide a discharge opening 18. This may be of any suitable cross-section either round, oval, or otherwise and preferably should extend out from the margin of the cap to assure easy pouring.

The internal structure of my measuring chamber will probably best be understood from examination of Figures 2 to 7, inclusive, and Figure 14. In my preferred form the measuring chamber is formed as part of the cap; however, in Figure 14 it is shown as a separate member. In the integral arrangement, I provide the measuring chamber 20 in such a form that it will lie close to the inner periphery of the cap after the showings particularly of Figures 2, 5, and 6. When so arranged only a quarter revolution of the container is required to effect the discharge of the measuring chamber after it is charged. The chamber proper is formed with a bottom wall 21, the discharge opening 22, and a cutaway side wall so as to provide the filling opening 24. This cutaway portion occurs in the inner wall 26. The opposite side wall preferably takes the curve of the cap so that wall 28 will lie close to the inside of the jar. In this way, as is probably best illustrated in Figure 9, the measuring chamber can be charged even though there be but a very small quantity of material in the container. End wall 30 is also cut away slightly at 32 to form a continuation of the charging opening. The space, as illustrated at 34 between measuring chamber 20 and the inside of the container C, should be sufficient so that no single granule or kernel of the pourable material can be wedged into this restricted opening. This clearance can, however, for the majority of uses be quite small as the neck of the container passes between surface 28 and the threaded portion 36 of the cap and as allowance must be made for the threads 38 in the container adequate space is provided for the removal of any cores that may be used in the die casting or molding of this member.

In Figures 13 and 14 I have illustrated a modified construction in which a spun or pressed metal cap 40 is employed into which is inserted through opening 42 the measuring and discharge member 44. This member has the two sides cut away at 46 and 47 so as to provide the charging opening and has a spout as 48 which sticks up through opening 42 and extends out beyond the periphery of the cap so that, in effect, the same structure is provided as illustrated in Figures 1 to 12, inclusive. In this form, however, by having the two members separate a greater range of manufacturing expediency is obtained.

In Figure 15 I have illustrated a further modification of my cap. In this form I prefer that the cap portion as 50 be made either of a transparent plastic or glass. The general structure is similar to that previously described in that a discharge spout 51 is provided. As before the cap is provided with the threaded attaching means at 52. However, in addition to these former structures, I have used a graduated measuring chamber 54, made of transparent material, provided preferably with a plurality of etched lines, or otherwise configured rings, 56 which are so placed as to measure definite quantities. At the bottom of the measuring chamber, which in this instance is elongated into the neck of the container C, I provide a closure valve preferably a ball, at 58 which is connected by rod 60 to a closure cap 62. Beneath the cup-like cap 62 and seated within a recess formed by the wall 64 I provide a compression spring 65 so that the ball 58 is normally seated by spring 65 and to open the same, downward pressure must be applied to cap 62. It will be apparent that when the measuring chamber is filled through opening 67 an amount can be discharged past ball 58 so as to bring the level of the material or liquid to any one of lines 56 so that definite quantities can be measured. As soon as accurate measurement has been determined and this arrangement presupposes that the container C is also of transparent material, the container is tipped so that the liquid or material will flow out through spout 51. As a convenience I have provided preferably a rubber cap at 68 which can normally be used to seal the container against loss and particularly where liquids are being measured the cap would be kept in place until chamber 54 was filled, then removed to admit of pouring out the material measured.

Method of operation

In using my container it is so arranged that the jar stands upright as is illustrated in Figure 8. To charge the measuring chamber 20 the container is tipped either on one side or upended after the showing of Figure 9. This will fill chamber 20 and the container can then be inverted to its normal position as illustrated in Figures 10 and 11 or discharging may be accomplished from the inclined position. To dispense the materials thus measured the container, if inverted, must again be laid on its side, at least, after the showing of Figure 12 and then rotated through 90 degrees to insure expelling all of the material. This is a very simple operation once understood; the container is tipped in the direction of the measuring chamber and, without changing the position of the hand on the container, the container is merely rolled 90 degrees so as to place discharge spout 18 in its lowermost position and the measured contents are easily dispensed as slowly as desired, giving ample opportunity for the user to distribute material, be it sugar, salt, or like ingredients, over food that is being seasoned.

It will be apparent it is believed from this disclosure that the container must be inverted and rolled a partial revolution for each time the measuring chamber is filled and discharged.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

I claim:

1. A measuring and dispensing cap for receptacles comprising a cover, a transparent housing subjoined thereto having measuring indicia thereon and provided with inlet and discharge ports, a valve and operating means therefor in the lower extremity of said housing for discharging excess material into the receptacle, and means connecting said discharge port with the exterior of the cover.

2. A measuring and dispensing cap for receptacles comprising a cover, a transparent housing subjoined thereto having measuring indicia thereon and having a lower opening for discharging excess material into the receptacle, a ball valve seated in said opening and operating means exterior of said cover, said housing having opposed intake and discharge ports, and said discharge port being in communication with the exterior of the cover.

3. A detachable measuring and dispensing cap for receptacles comprising a cover, an exterior spout extending laterally beyond the periphery of the cap and open to the interior thereof, a housing subjoined to the cover within the receptacle and an intake port at one side of the housing, an interior baffle wall within the housing and spaced a suitable distance from the intake port to form a discharge port, and said discharge port being open to the exterior spout.

CLARENCE H. BAILEY.